Sept. 14, 1954
C. A. TUDBURY
2,689,297
HIGH-FREQUENCY INDUCTOR ARRANGEMENT
Filed March 10, 1951
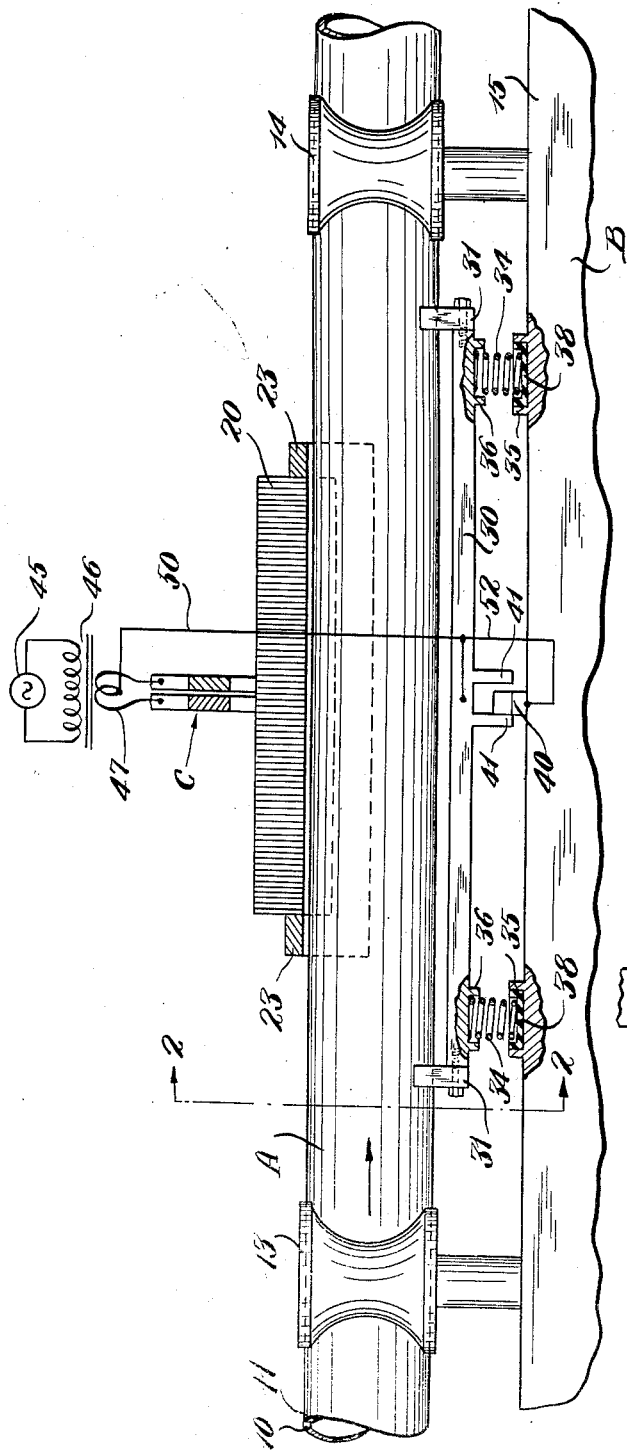
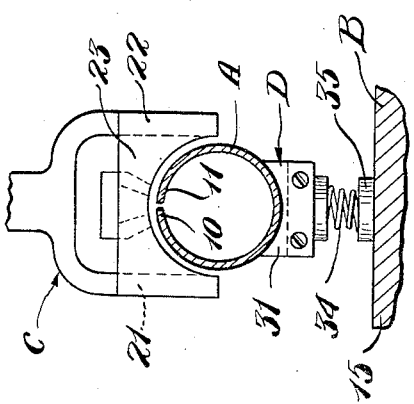
INVENTOR.
CHESTER A. TUDBURY
BY
*Alfred E Body*
ATTORNEY Patented Sept. 14, 1954

2,689,297

UNITED STATES PATENT OFFICE 2,689,297

HIGH-FREQUENCY INDUCTOR ARRANGEMENT

Chester A. Tudbury, Cleveland, Ohio, assignor to The Ohio Crankshaft Company, Cleveland, Ohio, a corporation of Ohio Application March 10, 1951, Serial No. 214,919

7 Claims. (Cl. 219—10.53)

This invention pertains to the art of electrical high-frequency induction heating and, more particularly, to apparatus for heating longitudinal lengths of elongated metallic workpieces.

The invention is particularly adapted to equipment for continuous seam welding of the edges of metallic strip into pipe or tube using high-frequency induction heating to heat the edges to the welding temperature and, for the purpose of clarity, will be described with particular reference to such equipment, although the invention is useful elsewhere. The use of high-frequency induction heating and suitable inductors for heating the edges have been clearly set forth and described in the copending applications of Phillips N. Sorensen, Serial No. 58,228, filed November 4, 1948, now Patent No. 2,632,840, dated March 24, 1953, and Serial No. 86,066, filed April 7, 1949, now abandoned, with the disclosure thereof incorporated in a continuation-in-part application, now Patent No. 2,652,474, dated September 15, 1953. The present invention provides means in combination with inductors of this type for accomplishing the objects of the invention.

In the art of continuous seam welding, flat strip is formed by suitable rolls into a closed tube with the edges in close spaced opposed relationship. The edges are then heated to a welding temperature by high-frequency induction heating. The heated edges are then brought into pressure engagement by welding rolls, the entire operation being done continuously and at rather high rates of speed. A typical installation now in use continuously welds at tube speeds of around 200 feet per minute using approximately 300 kws. of 10,000 cycle per second electrical energy.

As described in the above referred to applications, the high-frequency inductors include an elongated main conductor which is disposed parallel to and immediately over the edges of the tube to be heated and one or more side or return conductors which are disposed remotely from the edges and generally adjacent the sides of the tube. High-frequency currents flowing in the main conductor induce highly-concentrated, high-frequency currents to flow longitudinally in each edge immediately underneath the conductor. It has been estimated that these currents, for the conditions above referred to, are in the neighborhood of 8,400 amperes and flow in a very narrow width adjacent the edges to produce a very rapid and concentrated heating effect. The return-current path is, according to the above referred to applications, in the portions of the tube remote from the edges. These currents, while generally of the same magnitude as the current in the edges themselves, are spread out over a large part of the circumferential width of the tube and do not produce any appreciable heating effect.

Excellent welds have been produced at high speeds of movement of the tube using inductors of this type. However, difficulty has been experienced with unduly short life of the bearings which support the forming and welding rolls on the base of the machine.

As a result of the present invention, I have discovered that the ideal current flow described above which it was thought resulted with the inductors as above described did not actually result and that some of the concentrated main heating currents in the edges, instead of returning in the portions of the tube remote from the edges, actually flowed longitudinally of the tube beyond the ends of the inductor, the return path being formed through the forming and welding rolls and the metallic base of the seam-welding machine. These currents flow through the bearings supporting the rolls and, either by electrolysis or arcing or otherwise, deteriorated the surfaces of the bearing and radially shortened their life.

This current flow may be due to a number of reasons which now seem quite apparent but required much thought and experimental work before becoming so. For example, the electrical resistance of the side walls of the tube under the inductor is extremely low and it was thought that all of the return currents would, obviously, follow this path as a return path. However, upon further analysis, it appears that the welding machine itself; that is, the welding rolls, the forming rolls and the base of the machine, form a parallel electrical circuit with the side walls of the tube. The electrical resistance of this circuit may be relatively high compared to that of the side walls of the tube; but, even with a difference of twenty times, with a total return-current flow in excess of 8,000 amperes, the electrical circuit through the machine would carry currents in excess of 400 amperes. Another reason to which the return-current flow through the welding machine itself may be attributed is the fact that the main heating conductor normally has a much higher degree of electrical coupling with the tube than do the side conductors; i. e., the side conductors have a higher leakage reactance than the main conductor which shows up as currents flowing through the electrical circuit formed by the base of the machine itself and the rolls.

It has been proposed to use rolls which are electrically insulated from the base or to divide the base under the inductor and electrically insulate the two sections or to provide other forms of electrical insulation on the seam-welding equipment, but any one of these solutions would involve major redesigning and reconstruction of the seam-welding equipment and would, in any event, be quite expensive.

The present invention contemplates means and method for overcoming all of the above difficulties and eliminating or mitigating the flow of current through the workpiece supporting, forming and welding rolls which is simple, inexpensive and dependable in operation.

In accordance with the invention, there is provided, in a high-frequency induction-heating machine including a pair of spaced workpiece supports electrically connected together by the base of the equipment, the combination of a high-frequent inductor disposed between the supports adapted to induce heating currents to flow in the workpiece in a direction between said workpiece supports with low-impedance means adapted to be in electrical contact with portions of the workpiece beyond the ends of the high-frequency inductor and provide a low-impedance return path for the heating currents. The low-impedance means comprises a conductor member of large cross section having contact members at its ends which bear the workpiece at spaced points between the workpiece supports. Also, in accordance with the invention, this low-impedance means may be connected at its mid point with a mid point on the inductor to maintain the voltage differentials between the workpiece and the inductor at a minimum.

The principal object of the invention is the provision of new and improved combination of a high-frequency inductor which induces longitudinal currents to flow in an elongated workpiece and means adapted to electrically engage the workpiece for providing a low-impedance return path for the heating current and preventing the flow of stray currents in the supporting means for the workpiece, which is simple in construction, economical to manufacture and positive in operation.

Another object of the invention is the provision of new and improved means for holding the voltage potential between a high-frequency inductor and its workpiece at a minimum.

Another object of the invention is the provision of new and improved combination of a continuous tube seam-welding machine having a base; welding and forming rolls supported thereon and in electrically-connective relationship; a high-frequency inductor disposed between said welding and forming rolls, the inductor inducing main heating currents to flow in the tube in a direction between the welding and forming rolls; and a low-impedance means in electrical connection with the tube at points beyond the end of the inductor to provide a low-impedance return path for the heating current.

The invention will be specifically set forth and defined in the claims at the end of this specification. The invention may take physical form in a number of equivalent but different-appearing parts and arrangement of parts, a preferred embodiment of which will be described in detail in this specification and illustrated in the accompanying drawing which is a part hereof, and wherein:

Figure 1 is a side elevational view of a seam-welding machine embodying the present invention; and Figure 2 is a cross-sectional view of Figure 1 taken approximately on the line 2—2 thereof.

Referring now to the drawing wherein the showing is for the purposes of illustration only and not for the purposes of limitation, Figure 1 shows a C-shaped tube A having edges 10, 11 to be welded advancing from left to right through a seam-welding machine B which includes the usual forming and welding rolls 13, 14 respectively, a high-frequency inductor C of known construction disposed between the welding and forming rolls for the purposes of heating the edges to the welding temperature and low-impedance means D opposite the inductor and disposed between the welding and forming rolls in electrical engagement with portions of the tube A beyond the end of the inductor C for the purpose of providing a low-impedance return-current path for currents in the tube A which might otherwise flow beyond the ends of the principal inductor C into the machine B.

The tube A forms no part of the present invention and may be made of any known or desired electrically-conductive material, such as iron or steel, and may be of any desired shape but, for the purposes of convenience, is shown as generally round.

The seam-welding machine B also forms no part of the present invention and may be of any desired construction. For the purposes of convenience, it is shown somewhat schematically as having a base 15 extending underneath the path of the tube A with bearings therein for rotatably supporting the forming and welding rolls 13, 14. It will be appreciated that the base is at all times electrically connected with the forming and welding rolls through the bearing supports so that these rolls and the tube A, which is also in electrical connection with the rolls, forms a completed electrical loop or circuit.

The high-frequency inductor C is similar to the type described in the above referred to patent applications of Phillips N. Sorensen and ideally causes high-frequency currents to flow in the tube A as shown in greater detail in those patent applications. Suffice it to say, for the purposes of description here, that the high-frequency inductor includes a main or principal conductor 20 which is disposed in close spaced parallel symmetrical relationship with the edges 10, 11 to induce very high-density high-frequency heating current to flow in the edges 10, 11 as the tube A passes from the forming rolls 13 to the welding rolls 14. The inductor C also comprises a pair of side conductors 21, 22 which extend parallel to and in spaced relationship to the principal conductor 20. These conductors, as shown, overlap the sides of the tube A. The corresponding ends of these conductors are electrically connected by end conductors 23. The currents in the conductor 20 and in the side conductors 21, 22 flow in opposite directions.

Ideally, the principal or center conductor 20, at any one instant, causes a high-density current to flow in the edges 10, 11 in one direction. These currents, as described in the above two referred to copending patent applications, make a return loop in the sides of the tube A remote from the edges 10, 11 and this return flow of current is aided by the current flowing in the two side conductors 21, 22 which tend to induce return currents to flow in the desired direction.

I have found, however, as a result of the present invention that some of the return current, instead of flowing in the side walls of the tube remote from the edges, 10, 11 but under the inductor C, actually flows beyond the end of the inductor C to the welding and forming rolls, then into the base 15 of the seam-welding machine, making a complete loop or circuit in this way. These currents may be on the order of 500 or 600 amperes and tend to deteriorate the bearings which support the welding and forming rolls relative to the base 15. I have found that the flow of currents through the welding and forming rolls in the base 15 may be substantially eliminated by the use of the low-impedance means D.

In the embodiment of the invention shown, the low-impedance means D comprises a rectangular bar 30 of high-conductivity material, such as copper or silver, positioned on the side of the tube A opposite from that of the inductor C. This bar 30 has a length greater than that of the inductor C and on each end thereof, a brush 31 is provided of electrically-conductive material which is bolted to the ends of the bar 30 by bolts or the like threaded into the ends of the bar 30. These brushes have upper curved surfaces which engage the lower side of the tube A. The brushes 31 are preferably of carbon material similar to the brushes used in electrical motors and have the characteristic of providing a low-contact resistance with the tube A. Also, the brushes should not be of a hardness such as to scratch the external surfaces of the tube A. The brushes are held in firm pressure engagement with the lower sides of the tube A by means of a pair of helical coil springs 34, one disposed adjacent each end of the conductor bar 30. Small cylindrical flanges 35 on the base 15 and small cylindrical flanges 36 on the lower side of the conductor bar 30 provide wells onto which the ends of the springs 34 may extend, thus accurately positioning the springs 34 relative to the equipment. Obviously, other types of resilient means could be employed for urging the brushes 31 into firm, pressure, electrically-conductive relationship with the bottom side of the tube A. A cup 38 of insulating material at the lower end of the springs 34 provides electrical insulation and prevents electrical currents from flowing from the bar 30 into the base 15 through the springs 34.

Means are provided for positioning the low-impedance means D relative to the inductor C and the machine B. In the embodiment of the invention shown, a lug 40 extends upwardly from the base 15 on the center line of the inductor C. A pair of spaced lugs 41 extend downwardly from the central portion of the bar 30 on both sides of the lug 40. The purpose of these lugs is to prevent the low-impedance means D from being moved out of the position shown by the frictional forces between the brushes 31 and the lower side of the tube A.

The high-frequency inductor C is energized from a high-frequency power source 45 through an impedance-reducing transformer 46 having a two-turn secondary 47. In the past, difficulty has been experienced with carbon deposits building up on the lower face of the main conductor 20, eventually resulting in sparking occurring between the tube A and the inductor C, although the voltages appearing across the inductor C may be only on the order of 40 volts or so. Because of the frequencies involved, possible resonating effects and the like and apparently higher voltages than the 40 volts energizing the inductor may develop between the tube A and the inductor C. To reduce the voltage differentials between the tube A and the inductor C, a low-impedance electrical connection 50 shown schematically in the drawings is provided between the center point of the bar 30 and the center point of the two-turn secondary coil 47. Additionally, a low-impedance lead 52 shown schematically extends from this same center point to a point on the base 15 of the machine aligned with the center line of the inductor C. These interconnections reduce the voltage potentials that may develop and are a safety precaution.

While only one pair of brushes 31 have been shown as engaging the lower surfaces of the tube A, it will be appreciated that additional sets intermediate the ends of the bar 30 could be provided to engage the lower sides of the tube A and provide a still lower impedance connection therewith. Also, obviously, other forms of resilient members could be employed to maintain the brushes 31 in engagement with the tube A.

Also, more than one bar 30 could be employed and may be water cooled as is conventional with high-frequency inductor practice. Water-cooling connections have not been shown in the figures, either for the conductor bar 30 or in the main inductor C. Also, more than one conductor bar may be employed, they being in circumferentially spaced relationship around the sides of the tube A or the conductor bar 30 may be extended or widened in a circumferenttial direction so as to surround a greater portion of the circumferential width of the tube A; or, if desired, the ends of the conductor 30 could completely surround the tube A, it being obvious that intermediate the ends, the widened conductor bar 30 would be cut away to provide room for the main inductor C.

In operation, the main conductor 20 induces concentrated, high-frequency currents to flow longitudinally of the tube A in the edges 10, 11. The normal return path for these currents is in the sides of the tube removed from the edges 10, 11. In the absence of the present invention, however, some of the currents flow longitudinally of the tube A beyond the ends of the inductor C into the rolls 13, 14 and complete an electrical circuit through the base 15. The low-impedance means D electrically engages the sides of the tube beyond the ends of the inductor C and provide a low-impedance path for this return flow of current and effectively bypasses a large portion of the current which would normally flow in the undesired return circuit through the rolls and the base 15. The effect is to radically cut down the deteriorating effects of the currents in the seam-welding machine itself. In a like manner, the electrical connections between the center tap of the transformer and the low-impedance means D and the mid point of the base 15 under the inductor C tends to maintain all portions of the equipment, including the tube A, at essentially the same electrical potential.

The present invention may be used either alone as herein described or in conjunction with the invention described in my copending patent application Serial No. 214,920 filed concurrently herewith.

It will thus be seen that the preferred embodiment described is capable of accomplishing all the objects of the invention and others and that simple and expedient means have been provided for bypassing the return currents which might otherwise tend to flow beyond the ends of the high-frequency inductor back to the other end of the inductor so that the currents will not flow through the rolls into the supporting equipment for the workpiece.

Obviously, modifications and alterations will occur to others upon a reading and understanding of this specification and it is my intention to include all such modifications and alterations insofar as they are the equivalent of or come within the scope of the appended claims.

Having thus described my invention, I claim:

1. A seam-welding machine comprising, in combination, a base; forming and welding rolls supported on said base in spaced relationship and in electrical engagement with said base and having a tube to be welded moving between said rolls; a high-frequency inductor disposed between said welding rolls and having at least a main conductor which induces currents to flow longitudinally in said tube and a conductor member independently of said inductor disposed on the side of said tube opposite from said inductor and substantially spaced therefrom having means to electrically engage said tube beyond the ends of said inductor.

2. High-frequency induction-heating apparatus comprising a base and a pair of spaced workpiece supports in electrical contact with said base; a high-frequency inductor disposed between said supports and having at least a conductor member adapted to induce currents to flow in a workpiece in a direction between said spaced supports and a second conductor member having a length greater than the length of said inductor disposed opposite said inductor and remote from the magnetic field of said inductor, said conductor member having brushes thereon at the ends adapted to electrically engage the sides of said workpiece whereby to provide a low-impedance path for currents tending to flow beyond the ends of said inductor.

3. In high-frequency induction-heating apparatus, a base; a pair of spaced workpiece supports adapted to support a workpiece; a high-frequency inductor between said supports including at least one conductor member adapted to induce currents to flow in the workpiece in a direction from one support toward the other and a low-impedance electrically-conductive member positioned between said supports and having electrically conductive means adapted to continuously engage the workpiece beyond the ends of said inductor but between said points of support, said member being positioned on the side of said workpiece remote from said inductor and remote from the magnetic field thereof.

4. In a continuous seam-welding machine for welding tube, a base; a high-frequency inductor disposed between said welding and forming rolls and having an elongated conductor member adapted to be in close spaced parallel relationship with said tube; a conductor member on the side of said tube remote from said conductor member and out of inductive relationship therewith having a longitudinal length slightly greater than the longitudinal length of said inductor member having means at the ends thereof adapted to be in electrical contact with the walls of said tube and means for urging said means into continuous electrical engagement with said tube.

5. In a continuous seam-welding machine, including a base; welding and forming rolls rotatably supported thereon; a tube member supported by said rolls and advancing from the forming rolls to the welding rolls; a high-frequency inductor disposed between said rolls and having a conductor in inductive relationship with the edges of said tube to be welded; means for energizing said inductor including a transformer, a conductor member disposed on the side of said tube opposite from said inductor and having means in electrical sliding engagement with the walls of said tube beyond the ends of said inductor; and electrical means extending from the center of said last-mentioned conductor member to the center of said transformer.

6. The combination of a high-frequency inductor having an elongated conductor member adapted to be in close spaced parallel relationship with an elongated workpiece and induce high-frequency heating currents therein with low-impedance means including an elongated conductor member independent of and disposed opposite and spaced from said conductor member and having means adapted to slidingly engage sides of said workpiece opposite the said inductor and provide a low-impedance path for return currents induced by said conductor member.

7. The combination of a high-frequency inductor having an elongated conductor member adapted to be disposed in close spaced current-inducing relationship with an elongated workpiece and adapted to be disposed between supports for the workpiece with a low-impedance means having electrical contact members adapted to electrically engage the tube, said low-impedance means comprising a conductor independent of said first-mentioned conductor member and disposed in generally aligned relationship with said inductor on the side of said workpiece remote from said inductor and having spaced contact means adapted to engage said workpiece and resilient means for urging said contact means against the sides of said workpiece opposite said inductor.

References Cited in the file of this patent

UNITED STATES PATENTS

| Number | Name | Date |
|---|---|---|
| 2,290,338 | Koehring | July 21, 1942 |
| 2,320,801 | Simons | June 1, 1943 |
| 2,423,922 | Arndt | July 15, 1947 |
| 2,475,348 | Black | July 5, 1949 |
| 2,483,973 | Goettings | Oct. 4, 1949 |
| 2,635,177 | Body et al. | Apr. 14, 1953 |

FOREIGN PATENTS

| Number | Country | Date |
|---|---|---|
| 616,063 | Great Britain | Jan. 14, 1949 |
| 616,117 | Great Britain | Jan. 17, 1949 |